United States Patent Office 2,921,073
Patented Jan. 12, 1960

2,921,073
SUBSTITUTED PYRIDINE AND QUINOLINE N-OXIDES AND PROCESS FOR PRODUCING THE SAME

Lloyd H. Conover, Quaker Hill, Conn., Arthur R. English, Hohokus, N.J., and Clifford E. Larrabee, New London, Conn., assignors to Chas. Pfizer & Co., Inc., Brooklyn, N.Y., a corporation of Delaware No Drawing. Application May 8, 1958
Serial No. 733,852

12 Claims. (Cl. 260—256.5)

This application is concerned with new and useful chemical agents. More particularly, it is concerned with the free bases and acid addition salts of 2-(2'-imidazolinylmercapto) pyridine N-oxide, 2-(2'-tetrahydropyrimidylmercapto) pyridine N-oxide, 2-(2'-tetrahydrodiazepinylmercapto) pyridine N-oxide and with the analogous quinoline N-oxide compounds.

The active compounds of this invention are reaction products of substituted and unsubstituted halopyridine and haloquinoline N-oxides with substituted and unsubstituted imidazolidine-2-thiones, hexahydrodiazepine-2-thiones and hexahydropyrimidine-2-thiones. Examples of substituents on a substituted carbon atom of the quinoline or pyridine N-oxide include alkyl groups containing up to three carbon atoms, halogen atoms and alkoxy groups containing up to three carbon atoms. Examples of substituents on a substituted nitrogen atom of an imidazoline, tetrahydropyrimidine or tetrahydrodiazepine ring include alkyl groups containing up to twelve carbon atoms, and on a substituted carbon atom of said rings alkyl groups containing up to four carbon atoms.

The preferred active compounds for the treatment of superficial mycoses are represented by the following structural formula

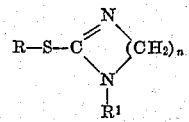

R is selected from the group consisting of 2-pyridyl-n-oxide and 2-quinolyl-n-oxide. The sulfur atom also is attached to the number two carbon atom of an imidazoline, tetrahydropyrimidine or tetrahydrodiazepine ring. It is apparent, therefore, that n in the above structural formula may be either of the integers two, three or four. $R^1$ is hydrogen or an alkyl group containing up to twelve carbon atoms.

In copending patent application Serial No. 647,497, filed March 21, 1957, and now abandoned, it was disclosed that certain pyridine N-oxides and quinoline N-oxides with tetrahydropyrimidylmercapto or imidazolinylmercapto groups attached to the number two carbon atoms are active anti-infective agents. It has now been discovered that these same pyridine N-oxides and quinoline N-oxides with diazepinylmercapto groups identically attached are also active anti-infective agents. This application is a continuation-in-part of the previously filed application.

The compounds of this invention are prepared by treating 2-halopyridine N-oxides or 2-haloquinoline N-oxides, either as the free bases or as acid addition salts, with imidazolidine-2-thiones, hexahydrodiazepine-2-thiones or hexahydropyrimidine-2-thiones.

The 2-halo compounds used in preparing the useful agents of this invention may be either 2-fluoro, 2-chloro, 2-bromo or 2-iodopyridine N-oxides or the analogous quinoline N-oxides. Because the bromine and chlorine substituted compounds combine the desirable features of ease of preparation and relatively high activity, they represent the preferred compounds of this invention. The halopyridine and haloquinolines may be prepared by procedures known to those skilled in the art. The bromo compound can be prepared by treatment of 2-aminopyridine perbromide hydrobromide or 2-aminoquinoline perbromide hydrobromide with constant boiling hydrobromic acid followed by sodium nitrite. The 2-chloro compounds may be made from the 2-amino compounds by treatment with nitrous acid in the presence of hydrochloric acid at a reduced temperature. The iodo compound is prepared by treating the corresponding amino compound with a large excess of nitrous and hydriodic acids at an elevated temperature. The fluoro compound is best prepared by treating a diazatized 2-amino compound with fluoroboric acid. The bromo compounds have also been prepared by vapor phase bromination of pyridine and quinoline.

The halogen compounds are converted to N-oxides by treatment with peracids such as peracetic, perbenzoic or persulfuric. These acids can be generated in situ using mixtures of hydrogen peroxide and the appropriate acids or they can be prepared independently and then utilized in the reaction. The N-oxides are generally isolated from the reaction mixture by first diluting the mixture with water and then treating the aqueous mixture with an alkaline reagent to make the solution neutral. The neutral solution is then extracted with an organic solvent. If it is desired to isolate the N-oxide as a free base, the organic solvent may be dried and removed in vacuo. If the acid addition salt is desired the organic solution of the free base is first dried and then treated directly with an acid. The acid addition salt may be isolated by distilling off the solvent, preferably in vacuo.

It is obvious that, using this procedure, compounds may be prepared in which a halogen acid addition salt contains the same halogen atom as is substituted on the 2-position of the ring; for example, 2-bromoquinoline N-oxide hydrobromide. It is possible also to prepare acid addition salts in which the acid contains an anion which is not identical with the atom attached to the 2-position of the pyridine or quinoline ring; for example, 2-iodoquinoline N-oxide sulfate, 2-bromopyridine N-oxide nitrate or 2-fluoropyridine N-oxide hydrochloride. Both of these types of acid addition salts are useful in preparing the active compounds of the instant invention.

Imidazolidine-2-thiones, hexahydrodiazepine-2-thiones and hexahydropyrimidine-2-thiones used in this invention can be prepared by heating the appropriate diaminoalkanes with carbon disulfide as described by A. F. McKay in the Journal of the American Chemical Society, volume 78, page 1618, and in the Canadian Journal of Chemistry, volume 34, page 1567. The preparation is also illustrated in the examples.

For the preparation the active compounds of this invention 2-halopyridine N-oxide or 2-haloquinoline N-oxide, either as the free base or as an acid addition salt, is reacted with an imidazolidine-2-thione, hexahydrodiazepine-2-thione or hexahydropyrimidine-2-thione. The reaction is best carried out in an inert organic solvent such as the lower alkanols and ketones. Those, for example, containing up to five carbon atoms such as methanol, ethanol, acetone and methyl isopropyl ketone are useful. Halogenated hydrocarbon solvents containing up to six carbon atoms can also be employed advantageously. These include, for example, ethylene chloride, chloroform, carbon tetrachloride and chlorobenzene. Because of their high solvent powers, it is often advantageous, although not necessary, to add up to 20% dimethylformamide or dimethylsulfoxide to any one of the above disclosed solvents to aid in bringing the reactants into solution. Although an excess of either reactant can be used, the reaction generally is carried out by reacting approximately equimolar quantities of the reactants in the chosen solvent or solvent mixture and heating the solution at from 50° to 100° C. for a period of from about fifteen minutes to sixteen hours. In preferred applications of the reaction the temperature employed is from 50° to 80° C. since above 80° C. there is some tendency for the compounds to decompose. If the starting material employed is an acid addition salt of an N-oxide excellent yields are generally obtained after about one hour of heating. If, on the other hand, the N-oxide is used as the free base, it is generally desirable to extend the period of heating to at least about six hours, optimum yields generally being obtained at the end of about twelve hours. Irrespective of whether the starting compound is an N-oxide free base or an N-oxide acid addition salt, the compound obtained in accordance with the above described reaction is an acid addition salt. If the N-oxide acid addition salt contains the same halogen atom on the nucleus as in the anion of the acid the product obtained is a pure acid addition salt. If, on the other hand, the atom on the nucleus and the anion of the acid are dissimilar the product obtained is generally a mixture of acid addition salts. In preferred applications of the reaction then, the atom on the nucleus and the anion of the acid are identical. There is, however, no great disadvantage in utilizing compounds with dissimilar atoms and anions.

The acid addition salts are readily converted to free bases by treatment with an alkaline reagent.

It is best not to prepare the free base in a hydroxylic solvent such as water or an alkanol since the compounds are somewhat less stable in these reagents than in non-hydroxylic solvents. Several other organic solvents can be used in the preparation of the organic base. These include liquid aliphatic hydrocarbon solvents and their halogenated derivatives containing up to ten carbon atoms, liquid aliphatic ethers containing up to eight carbon atoms, liquid aliphatic and aromatic ketones containing up to eight carbon atoms and N-mono- and di-alkylated derivatives of formic or acetic acid each alkyl group containing up to three carbon atoms. Suitable solvents, therefore, include hexane, nonane, chloroform, carbon tetrachloride, benzene, chlorobenzene, n-butyl ether, dioxane, ethyl ether, acetone, methyl ethyl ketone, methyl isobutyl ketone, N-methyl formamide and N-propyl acetamide.

Preferred alkaline reagents include nitrogenous organic bases such as trimethyl amine, triethyl amine, aniline, methyl aniline, diethyl aniline, para-toluidine, pyridine, etc. These bases react with the acid addition salt in organic solution to neutralize the acid and liberate the free base.

For pharmceutical applications the acid addition salts prepared should be pharmaceutically acceptable. Typical pharmaceutically acceptable acid addition salts include the bromide, chloride, iodide, sulfate, phosphate, citrate, gluconate and tartrate. Pharmaceutically unacceptable acid addition salts may be used for the purification of compounds of the invention. For example, the compound may be prepared and isolated as a pharmaceutically unacceptable acid addition salt, for example, the fluoride. This salt may be recrystallized, for example, from ethanol and then converted to the free base or to a pharmaceutically acceptable acid addition salt by treatment of the free base with a pharmaceutically acceptable acid.

The reaction described above for the preparation of a therapeutically active acid addition salt of this invention produces halogen acid addition salts. Other addition salts can be prepared by procedures known in the art. One highly useful method comprises contacting the halogen acid addition salt with a basic anion exchange resin, for example, a highly basic compound such as the Rohm & Haas compound Amberlite IRA-400 in the acid form. This resin is a polyquaternary ammonium compound which is prepared by chloromethylating a highly cross-linked copolymer of styrene and divinylbenzene and treatment of the chloromethylated material with a tertiary amine such as trimethyl amine. To prepare an acid addition salt of this invention, for example, the tartrate, the resin is first contacted with tartaric acid whereupon an anion exchange takes place converting the quaternary halide to the tartrate. The tartrate resin is then contacted with a halogen acid addition salt of this invention, and a further anion exchange takes place converting the halogen acid addition salt to the tartrate and leaving the halide ion on the resin. The tartrate salt can then be recovered from the eluate by a number of methods such as evaporation or solvent precipitation. This same procedure can be used to prepare sulfate, nitrate, phosphate, citrate, acetate and other acid addition salts.

In addition to their use in the treatment of superficial mycoses in animals, including humans, pharmaceutically acceptable compounds of this invention also show significant in vitro activity against the following pathogenic microorganisms.

| Organism | Minimum Inhibitory Concentration in Micrograms Per Milliliter |
|---|---|
| Micrococcus pyogenes var. aureus | 3.12 |
| Streptococcus pyogenes | 0.39 |
| Streptococcus faecalis | 1.56 |
| Diplococcus pneumoniae | 3.12 |
| Erysipelothrix rhusiopathiae | 0.625 |
| Corynebacterium diphtheraie | 0.78 |
| Listeria monocytogenes | 6.25 |
| Bacillus subtilis | 0.78 |
| Clostridium perfringens | 1.56 |
| Lactobacillus casei | 1.56 |
| Bacterium ammoniagenes | 0.78 |
| Micrococcus pyogenes var. aureus 376 | 0.78 |
| Micrococcus pyogenes var. aureus M/r | 0.78 |
| Micrococcus pyogenes var. aureus P/r | 0.78 |
| Micrococcus pyogenes var. aureus M1 | 0.19 |
| Micrococcus pyogenes var. aureus M2 | 0.78 |
| Micrococcus pyogenes var. aureus M12 | 0.78 |
| Micrococcus pyogenes var. aureus M13 | 0.78 |
| Micrococcus pyogenes var. aureus 400 | 0.78 |
| Micrococcus pyogenes var. aureus Ilo/r | 0.19 |
| Micrococcus pyogenes var. aureus TM/r | 0.78 |
| Micrococcus pyogenes var. aureus 93/4 | 0.78 |
| Micrococcus pyogenes var. aureus 105/r | 0.78 |
| Micrococcus pyogenes var. aureus 122/r | 0.78 |
| Candida albicans 8 | 0.312 |
| Saccharomyces cerevisiae | 1.56 |
| Aerobacter aerogenes | 6.25 |
| Escherichia coli | 6.25 |
| Proteus vulgaris | 25 |
| Pseudomonas aeruginosa | 50 |
| Salmonella typhosa | 6.25 |
| Klebsiella pneumoniae | 6.25 |
| Keisseria gonnorheae | 3.12 |
| Hemophilus influenzae | 0.78 |
| Erwinia amylovora | 3.12 |
| Shigella sonnei | 6.25 |
| Malleomyces mallei | 12.5 |
| Vibrio comma | 0.78 |
| Brucella bronchihiseptica | 6.25 |
| Salmonella pullorum | 3.12 |
| Salmonella typhosa | 3.12 |
| Desulfovibrio desulfuricans | 1.56 |
| Pasterella multocida | 0.19 |
| Histoplasma capsulatum | 0.1 |
| Microsporum canis | 10 |
| Blastomyces brasiliensis | 10 |
| Blastomyces dermatitidis | 10 |
| Trichophyton sulfureum | 10 |
| Trichophyton violaceum | 10 |
| Sporotrichum schenckii | 10 |
| Hormodendrum compactum | 10 |
| Cryptococcus neoformans | 10 |
| Phialophora verrucosa | 1 |
| Candida albicans 9 | 10 |
| Candida albicans 11 | 10 |
| Candida albicans 13 | 10 |
| Candida albicans C | 1 |
| Epidermophyton floccosum | 10 |
| Microsporum audouini | 0.1 pl |
| Trichophyton rubrum | 10 |
| Pityrosporum ovale Traub | 0.39 |
| Pityrosporum ovale 12098 | 0.39 |
| Torulopsis albida 1066—Y-1400 | 10 |
| Alternaria solani | <1 |
| Botrytis allii | 1 pl |
| Septoria nodorum | <0.1 |
| Endothia parasitica | <1 |
| Neocosmospora vasinfecta | 10 |
| Fusarium oxysporum | 10 |

| Organism | Minimum Inhibitory Concentration in Micrograms Per Milliliter |
| --- | --- |
| Nematospora coryli | >10 |
| Ceratostomella ulmi (Ophiostoma) | 10 |
| Sclerotinia fructiocola | 1 |
| Colletotrichum circinans | 1 |
| Verticillium albo-agrum | <1 |
| Physalosporamalorum | 1 |
| Helmintosporium victoriae | <0.1 |
| Hormodendrum resinae | 1 |
| Glomerella cingulata | 10 |
| Phoma betae | 1 |
| Fusarium lycopersici var. bulbigenus | 10 |
| Diplodia zeae | <0.1 |
| Rhizoctonia solani | <0.1 |
| Pythium debaryanum | 0.1 pi |
| Helminthosporum species | 1 |
| Mycogenes perniciosa | <0.1 |
| Penicillium sp. marathon number 7 | 10 |
| Rhizopus nigricans | <1 |
| Penicillium steckii | 10 |
| Aspergillus niger | 10 |
| Penicillium frequentans | 10 |
| Penicillium citrinum | 10 |
| Penicillium funiculosum | 1 pi |
| Aspergillus nidulans | 10 |
| Penicillium soppi | 10 |
| Aspergillus terreus | 10 |
| Aspergillus fumigatus | 10 |
| Paecilomyces varioti | 10 |
| Aspergillus flavus-oryzae group | 10 |
| Hormodendron sp. (Welmyer) | 10 |
| Mucor mucedo | 10 |
| Penicillium oxalicum | 1 |
| Schisosaccharomyces octosporum | 10 |
| Pullularia pullulans | 10 |
| Byssochlamys fulva | 10 |
| Cladosporium herbarum | 1 |
| Cladosporium (Hormodendron) cladosporioides | 1 |
| Endomyces fibuliger | 1 |
| Margarinomyces bubaki | 10 |
| Oospora lactis | 1 |
| Penicillium digitatum | 10 pi |

The notation "pi" means partial inhibition. The notation < means less than and the notation > means greater than.

Superficial mycoses, or ring worm, is a disease of man and domestic animals. It is fungus infection usually attributed to *Microsporum audouini* and/or *Trichophyton rubrum*.

The infection usually takes place in a susceptible animal after some trauma to the outer skin, for example, a scratch. As indicated by the name, the infection spreads in a circular or ring-like manner from the primary focus and gradually becomes larger as the skin at the periphery becomes involved. The hair is usually dry, the skin is scaley and the hairs often break off near the skin.

In the treatment of superficial mycoses the hair around the circular lesion is first clipped with the scissors and then removed down to the skin layer with a razor. The area is then washed and the active agent is applied either directly or in the form of a therapeutic composition using the usual pharmaceutically acceptable excipients and extending agents.

Ointments and powders are particularly useful. The extending agents used in these ointments or powders may be of the hydrophillic variety such as the various condensation products of ethylene and propylene oxide with ethylene and propylene glycol, or they may be of the hydrophobic types such as petrolatum and other hydrocarbon greases. For some applications, it may be desirable to prepare the therapeutic compositions in the form of dry powders with such agents as carboxymethylcellulose and alginic acid derivatives. These powders may be converted to emulsions or suspensions by the addition of water prior to applications to the infected area. If it is desired to treat the condition with a dry powder as, for example, when the area to be treated is moist from serous discharge an active agent of this invention may be mixed with a dry extending agent such as lactose or sorbitol.

As indicated above a therapeutic agent of this invention can be added directly to the infected area or it can be added in admixture with pharmaceutically acceptable extending agents. For certain applications it may also be desirable that the therapeutically effective mixture contain medicinal agents other than the compounds of the instant invention. Therapeutic compositions containing as the principal active ingredient at least 0.1% and up to 95% of an active compound of this invention are useful. The therapeutic concentration of the chosen composition will generally depend on the severity of the condition being treated as well as all other factors. These factors can be evaluated by the physician or veterinarian in attendance.

In one specific example of the use of the compounds of this invention a number of dogs infected with ring worm were treated by applying a petrolatum base ointment containing 1% by weight of 2-(2-imidazolinylmercapto) pyridine N-oxide hydrobromide to the involved area. Prior to the treatment large areas of the skin were inflamed and covered with a scaley crust. Portions of the inflamed area were excreting a serious discharge. After treatment for two weeks the scaley tissue had disappeared, the discharge was no longer evident and the inflammation had decreased in severity.

The following examples are given solely for the purpose of illustration only and are not to be construed as limitations of this invention, many apparent variations of which are possible without departing from the spirit or scope thereof.

EXAMPLE I

*2-(2'-imidazolinylmercapto) pyridine N-oxide*

A solution of 9.7 g. of 2-bromopyridine N-oxide in 300 cc. of chloroform was added to a solution of 5.1 g. of imidazolidine-2-thione while the mixture was stirred and heated under reflux. Refluxing continued for twelve hours and the precipitate which formed was isolated from the cooled mixture by filtration.

The acid addition salt was taken up in dioxane and treated with an equivalent of dimethyl aniline to form the free base.

EXAMPLE II

*2-(2'-imidazolinylmercapto) pyridine N-oxide hydrobromide*

A solution of 2-bromopyridine N-oxide hydrobromide in 1200 cc. of ethanol was added to a solution containing an equimolar portion of imidazolidine-2-thione in 300 cc. of ethanol. The resulting mixture was heated under reflux for one hour and the product which precipitated from the cooled solution isolated by filtration. It was dried at 58° C. (1 mm. of mercury), and recrystallized from ethanol to obtain an analytically pure sample; M.P. 153.0 to 156.5° C. (dec.).

*Analysis.*—Calc'd. for $C_8H_9N_3OS \cdot HBr$: C, 34.79; H, 3.65; N, 15.22; Br, 28.94. Found: C, 34.72; H, 3.52; N, 15.01; Br, 28.34.

EXAMPLE III

*2-(2'-imidazolinylmercapto) quinoline N-oxide hydrochloride*

A solution of 1.0 g. of 2-chloroquinoline N-oxide hydrochloride in 100 cc. of acetone was added to 0.5 g. of imidazolidine-2-thione in 50 cc. of acetone. The reaction mixture was heated for three hours and cooled in an ice bath. The product which crystallized from solution was recovered by filtration.

EXAMPLE IV

*2-(2'-imidazolinylmercapto)-3-bromoquinoline N-oxide*

A solution of 2,3-dibromoquinoline N-oxide hydrochloride in methanol was added to an equimolar solution of imidazolidine-2-thione in methanol and the solution refluxed for ten hours. It was cooled and the acid addition salt recovered by filtration.

The acid addition salt was taken up in dimethylformamide and treated with an equivalent of trimethylamine to form the free base.

EXAMPLE V

*2-(2'-tetrahydropyrimidylmercapto) pyridine N-oxide hydrobromide*

A solution of 6.4 g. of 2-bromopyridine N-oxide hydrobromide in 500 cc. of acetone was added to a solution of 2.7 g. of hexahydropyrimidine-2-thione in 200 cc. of acetone. The resulting mixture was refluxed for fifteen minutes, a precipitate formed and the mixture was cooled in an ice bath. The precipitate was collected by filtration and dried at 50° C. (1 mm. of mercury). An analytical sample was prepared by recrystallization from ethanol containing a small amount of hydrogen bromide; M.P. 160 to 161° C. (dec.).

*Analysis.*—Calc'd. for: $C_9H_{12}N_3OSBr$: C, 37.25; H, 4.17. Found: C, 37.12; H, 4.09.

EXAMPLE VI

*2-(2'-tetrahydropyrimidylmercapto) pyridine N-oxide*

A solution of 2-iodo pyridine N-oxide in methyl isopropyl ketone was added to an equimolar solution of hexahydropyrimidine-2-thione in methyl isopropyl ketone and the solution refluxed for sixteen hours. It was cooled and the acid addition salt recovered by filtration.

The acid addition salt was taken up in benzene and treated with an equivalent amount of p-toluidine to form the free base.

EXAMPLE VII

*2-(2'-(1-β-ethylhexyl) imidazolinylmercapto) pyridine N-oxide hydrobromide*

A solution of 6.4 g. of 2-bromopyridine N-oxide in 400 cc. of acetone containing 10 cc. of dimethylformamide was added dropwise to a solution of 5.3 g. of 1-(β-ethylhexyl) imidazolidine-2-thione in 100 cc. of acetone. The reaction mixture was refluxed for two hours, cooled and the product recovered by filtration. It was dried at 80° C. (1 mm. of mercury); M.P. 131.3 to 133.5° C. (dec.). The product was recrystallized from ethanol-benzene containing a small amount of hydrogen bromide.

*Analysis.*—Calc'd. for $C_{16}H_{24}N_3OS \cdot Br$: C, 49.72; H, 6.26. Found: C, 49.67; H, 6.56.

EXAMPLE VIII

*2-(1'-dodecyl-2'-imidazolinylmercapto) 3 - ethylpyridine N-oxide hydrofluoride*

A solution of 2-fluoro 3-ethylpyridine N-oxide hydrofluoride in chloroform was added to a 10% excess of 1-dodecyl-imidazolidine-2-thione in chloroform and the solution refluxed for one hour. It was cooled and the acid addition salt recovered by filtration.

EXAMPLE IX

*Hexahydrodiazepine-2-thione*

A solution of 40 g. of 1,4-diaminobutane in 140 cc. of ethanol was added dropwise to a stirred solution of 135 cc. of carbon disulfide in 140 cc. of ethanol while maintaining the temperature below 40° C. At the end of the addition period, the solution was cooled and the solid which separated recovered by filtration. The solid was heated in a flask at 150° C. until the evolution of hydrogen sulfide ceased. The residue was recrystallized twice from ethanol to give the desired product in pure form melting at 181 to 182° C.

EXAMPLE X

*2-(2'-tetrahydrodiazepinylmercapto) pyridine-N-oxide hydrobromide*

A solution containing 26.2 g. of 2-bromopyridine N-oxide hydrobromide in 1000 cc. of acetone plus a small amount of dimethylformamide was added to a solution containing 13.7 g. of hexahydrodiazepine-2-thione in 1000 cc. of acetone plus a small amount of dimethylformamide. The resulting mixture was heated under reflux for one-half hour and allowed to stand overnight at room temperature. The reaction mixture was then cooled in an ice bath and the precipitated product isolated by filtration. It was air dried to give 23.2 g. of the desired product. An analytical sample was prepared by thoroughly washing the product with acetone. It melted at 140 to 141° C. with decomposition. The melting point varied somewhat with the rate of heating.

*Analyses.*—Calc'd for: $C_{10}H_{14}N_3OS \cdot Br$: C, 39.48; H, 4.64. Found: C, 40.36; H, 4.59.

EXAMPLE XI

*2-(2'-tetrahydrodiazepinylmercapto) quinoline N-oxide*

A solution of 2-bromoquinoline N-oxide hydrochloride in 1200 cc. of acetone was added to a solution containing an equimolar portion of hexahydrodiazepine-2-thione in 1000 cc. of ethanol. The resulting mixture was heated under reflux for one hour and the product which precipitated from the cooled solution isolated by filtration.

The acid addition salt was taken up in dioxane and treated with an equivalent amount of dimethylaniline to form the free base.

EXAMPLE XII

*2-(2'-(1-β-ethylhexyl) tetrahydrodiazepinylmercapto)pyridine N-oxide hydrobromide*

A solution of 2-bromopyridine N-oxide in 500 cc. of diethyl ketone was added to a solution containing an equimolar portion of 1-(β-ethylhexyl)hexahydrodiazepine-2-thione in 500 cc. of diethyl ketone and the solution was refluxed for sixteen hours. It was cooled in the acid addition salt recovered by filtration.

EXAMPLE XIII

*2-1(1'-isopropyl-2'- tetrahydropyrimidylmercapto)-3,5-dibromo-pyridine N-oxide hydrobromide*

A solution of 2,3,5-tribromopyridine N-oxide hydrobromide in carbon tetrachloride containing 15% of dimethyl sulfoxide was added in 5% excess to a solution of 1-isopropyl-hexahydropyrimidine-2-thione in carbon tetrachloride. The solution was refluxed for six hours. It was cooled and the acid addition salt recovered by filtration.

EXAMPLE XIV

*2-(4',5'-dimethyl-2' - imidazolinylmercapto) - 7 - methoxy quinoline N-oxide hydrochloride*

A solution of 2-bromo-7-methoxy quinoline N-oxide hydrochloride in ethanol was added to an equimolar solution of 4,5-dimethyl - imidazolidine - 2 - thione in ethanol and the solution refluxed for eight hours. It was cooled and the acid addition salt recovered by filtration.

EXAMPLE XV

*2-(5'-n-butyl-2'-tetrahydropyrimidylmercapto) 3 - propyl pyridine n-oxide hydriodide*

A solution of 2-iodo 3-propyl pyridine N-oxide hydriodide in n-pentanol was added to an equimolar solution of 5-n-butyl-hexahydropyrimidine-2-thione in n-pentanol and the solution refluxed for one hour. It was cooled and the acid addition salt recovered by filtration.

EXAMPLE XVI

*2-(2'-imidazolinylmercapto) 6-propoxy quinoline N-oxide hydriodide*

A solution of 2-bromo-6-propoxy quinoline N-oxide in methanol was added to an equimolar solution of imidazolidine-2-thione in methanol and the solution refluxed for sixteen hours. It was cooled and the acid addition salt recovered by filtration.

EXAMPLE XVII

2-(1'-ethyl-2'-imidazolinylmercapto) 5-iodo pyridine N-oxide hydrochloride

A solution of 2-bromo-5-iodo propoxy pyridine N-oxide hydrochloride in chlorobenzene was added to an equimolar solution of 1-ethyl-imidazolidine-2-thione in chlorobenzene and the solution maintained at 80° for twelve hours. It was cooled and the acid addition salt recovered by filtration.

EXAMPLE XVIII

2-(2'-tetrahydropyrimidylmercapto) 5-fluoro pyridine N-oxide hydrochloride

A solution of 2-iodo-5-fluoropyridine N-oxide hydrochloride in propanol was added to an equimolar solution of hexahydropyrimidine-2-thione in propanol and the solution maintained at 80° for eight hours. It was cooled and the acid addition salt recovered by filtration.

EXAMPLE XIX

2-(2'-(1-α-phenylethyl)imidazolinylmercapto) pyridine N-oxide hydrobromide

A solution of 4.1 g. of 2-bromopyridine N-oxide hydrobromide, 10 cc. of dimethylformamide and 250 cc. of acetone was added dropwise to 3.65 g. of 1-(2-phenylethyl) imidazolidine-2-thione. The mixture was refluxed for forty-five minutes, cooled and the product recovered by filtration. It was dried at 50° C. (1 ml. of mercury) for twenty hours; M.P. 112.1 to 112.4° C. (turned yellow at 109.8° C.).

EXAMPLE XX

2-(2'-imidazolinylmercapto) pyridine N-oxide sulfate

A fifteen percent aqueous solution of 2-(2'-imidazolinylmercapto) pyridine N-oxide hydrochloride was stirred for three hours with an anion exchange resin which had been previously washed with aqueous sulfuric acid. The resin was removed by filtration and the solvent removed in vacuo to leave the sulfate acid addition salt as a residue.

Included among the anion exchange resins which were used for this process were Amberlite IRA–410 and Amberlite IRA–400 available from the Rohm and Haas Co., Dowex 1 and Dowex 2 available from the Dow Chemical Co.

A number of other acid addition salts were prepared using this procedure, including the acetate, tartrate, citrate, maleate, gluconate and nitrate.

What is claimed is:

1. A compound selected from the group consisting of the free bases and acid addition salts of compounds having the formula

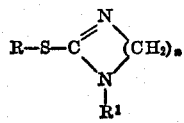

wherein R is selected from the group consisting of 2-pyridyl N-oxide and 2-quinolyl N-oxide, R¹ is selected from the group consisting of hydrogen and alkyl groups containing up to twelve carbon atoms, and $n$ is an integer from two to four.

2. 2-(2'-imidazolinylmercapto) pyridine N-oxide hydrobromide.

3. 2-(2'-imidazolinylmercapto) pyridine N-oxide.

4. 2-(2'-tetrahydropyrimidylmercapto) pyridine N-oxide hydrobromide.

5. 2-(2'-tetrahydropyrimidylmercapto) pyridine N-oxide.

6. 2-(2'-tetrahydrodiazepinylmercapto) pyridine N-oxide.

7. 2-(2'-tetrahydropyrimidylmercapto) pyridine N-oxide.

8. 2-(2'-tetrahydrodiazepinylmercapto) quinoline N-oxide.

9. 2-(2'-(1-β-ethylhexyl) tetrahydrodiazepinylmercapto) pyridine N-oxide hydrobromide.

10. A process for the preparation of a halogen acid addition salt of a compound of claim 1 which comprises reacting a compound selected from the group consisting of free bases and acid addition salts of 2-halopyridine N-oxide and 2-haloquinoline N-oxide with a compound selected from the group consisting of imidazolidine-2-thione, hexahydrodiazepine-2-thione and hexahydropyrimidine-2-thione in an inert organic solvent selected from the group consisting of alkanols and ketones containing up to five carbon atoms and halogenated hydrocarbon solvents containing up to six carbon atoms at a temperature of from 50° C. to 100° C. for a period of from fifteen minutes to sixteen hours.

11. A process as in claim 8 wherein up to twenty percent of a compound selected from the group consisting of dimethylformamide and dimethylsulfoxide is added to the inert organic solvent.

12. A process as in claim 10 wherein the temperature is from 50° C. to 80° C.

References Cited in the file of this patent

UNITED STATES PATENTS 2,813,102    Winthrop _____ Nov. 12, 1957

OTHER REFERENCES

Goodwin et al.: The Pharmaceutical Journal, vol. 181: 4952, pp. 233–235, September 1958.

Laurence et al.: British Med. Journal, pp. 700–702 (1958).

British Medical Journal, pp. 938–939, Apr. 19, 1958.

Keele: The Lancet, pp. 243–246, Jan. 31, 1959.